(12) United States Patent
Pan et al.

(10) Patent No.: US 7,688,789 B2
(45) Date of Patent: Mar. 30, 2010

(54) MIMO COMMUNICATION SYSTEM AND METHOD CAPABLE OF ADAPTIVE USER SCHEDULING

(75) Inventors: Zhengang Pan, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 1002 days.

(21) Appl. No.: 11/322,615

(22) Filed: Dec. 30, 2005

(65) Prior Publication Data
US 2006/0146755 A1 Jul. 6, 2006

(30) Foreign Application Priority Data
Dec. 30, 2004 (CN) ............ 2004 1 0104194

(51) Int. Cl.
*H04W 4/00* (2009.01)
(52) U.S. Cl. ............ 370/334; 370/332; 370/395.4; 455/452.2; 455/562.1
(58) Field of Classification Search .......... None
See application file for complete search history.

(56) References Cited

U.S. PATENT DOCUMENTS 7,142,864 B2 * 11/2006 Laroia et al. ............ 455/450

| | | | |
|---|---|---|---|
| 2004/0136349 A1 * | 7/2004 | Walton et al. | 370/338 |
| 2005/0157807 A1 * | 7/2005 | Shim et al. | 375/267 |
| 2005/0163252 A1 * | 7/2005 | McCallister et al. | 375/296 |

* cited by examiner

*Primary Examiner*—Daniel J Ryman
*Assistant Examiner*—Tito Pham
(74) *Attorney, Agent, or Firm*—Blakely, Sokoloff, Taylor & Zafman LLP

(57) ABSTRACT

A MIMO communication system capable of adaptive user scheduling. The MIMO communication system comprises a transmitting terminal, which sends data frames containing at least channel estimation signal and user data, and at least one receiving terminal, which recovers the user data and generates corresponding feedback information. The feedback information comprises an optimal transmitting antenna set dedicated to the receiving terminal, the achievable channel capacity by each antenna within the antenna set, and the degradation factors caused by each of other unselected antennas to each of the selected antennas. Depending on the feedback information, the transmitting terminal generates scheduling information based on which the adaptive user scheduling is conducted. The scheduling information comprises the scheduled users, number of data streams supported by each scheduled user, and the corresponding transmitting antenna for each of the data streams. The MIMO system can achieve the optimal channel capacity through adaptive user scheduling.

3 Claims, 11 Drawing Sheets

MIMO COMMUNICATION SYSTEM AND METHOD CAPABLE OF ADAPTIVE USER SCHEDULING

PRIORITY

The present patent application claims priority to and incorporates by reference the corresponding Chinese patent application serial no. 200410104194.6, titled, "MIMO Communication System and Method Capable of Adaptive User Scheduling", filed on Dec. 30, 2004.

BACKGROUND OF THE INVENTION

1. Field of the Invention

The present invention relates to a multiple input-multiple output (MIMO) system and a method of user scheduling, especially to an adaptive MIMO system and an adaptive user scheduling method.

2. Description of the Related Art

The future wireless communication system is required to support the extremely high speed data traffics, such as the videoconference, the video-on-demand and the interactive video game, etc. As required in the ITU-R M1645, it should support up to 100 Mbps for high mobility traffics and up to 1 Gbps for low mobility or fixed wireless traffics. The data rate of one wireless channel equals to the product of its spectrum width and the spectrum efficiency of the adopted technology. In order to improve the data rate, the spectrum width of the channel and the spectrum efficiency of the adopted technology should be improved. However, since the frequency resource is limited, the communication speed cannot be raised by infinitely increasing the spectrum width. Improving the spectrum efficiency of the adopted technology is one optimal solution for resolving the problem. Recent reseach has discovered that the MIMO technology can be used to improve the spectrum efficiency.

The so-called MIMO technology means that mutilple antennas are mounted at both the transmitting terminal and the receiving terminal in a communication system. The MIMO technology also includes that multiple antennas are mounted at either side, i.e., the single input-multiple output (SIMO) and the multiple input-single output (MISO). Different antennas are physically separated, and are generally regarded as introducing an additional signal domain—a space domain, into the communication system.

In the MIMO system, two signal processing methods are generally adopted to improve the spectrum efficiency of channels.

The first method is called the space-time coding (STC). It converts one original data stream into $n_T$ code streams by an encoder group and transmits them from different antennas (e.g., $n_T$ antennas) respectively. Each code stream is a different version of the original data stream and has the correlation with itself in time domain, and the correlation also exists between code streams. Thus, a better BER performance will be obtained by using these correlations at the receiving terminal having $n_R$ antennas, or, the spectrum efficiency will be improved by increasing the number of bits on each signal symbol when the BER performance is kept constantly. The gain that is obtained in the space domain by the space-time coding is called the diversity gain and the diversity gain provided by the MIMO system is $n_T \times n_R$.

The second signal processing method is called the layered space-time signal processing (LAST). It divides an original data stream into $n_T$ independent code streams and transmits each code stream from a different antenna, respectively. Each code stream is a part of the original data stream and no correlation exists between these code streams. At the receiving terminal, each code stream transmitted from different antennas is decomposed by multimensional signal processing methods, such as, the maximum likelihood (ML), the minimum means square error (MMSE), or the zero-forcing (ZF). Thus, $n_T$ independent channels are established between the receiving terminals and the transmitting terminals and the frequency efficiency is increased by about $n_T$ times. A gain that is obtained at the space domain by the layered space-time signal processing is called the multiplexing gain. A MIMO system can provide a maximum multiplexing gain which equals to the minimum one of the numerals, $n_T$, i.e., min ($n_T$, $n_R$).

Research has discovered that in a single user point-to-point MIMO communication system, there is a tradeoff between the diversity gain and the multiplexing gain provided by the space domain: the more the diversity gain, the less the multiplexing gain, and vice versa.

However, the modern communication systems are constructed based at least in part on a cellular structure, and the basic communication model thereof is that one base station in the cellular serves a plurality of users simultaneously, which leads to a problem of the multiple access. Traditional accessing methods include FDMA, TDMA and CDMA, which are all based on the circuit switch principle, i.e., each user is assigned with a fixed frequency width (for FDMA), a fixed time slot (for TDMA) or a fixed spread code (for CDMA).

In GSM, for example, the base station assigns eight time slots of a frame to eight users in the manner of the fixed time slot assignment on a 200K channel. The method can ensure the time delay characteristic of communication traffics and fits the traffics sensitive to the time delay, such as the voice communication. But the disadvantage of the method is that the resource assignment is set regardless of the conditions of the wireless channels. However, conditions of wireless channels change greatly, the system will lose its performance if users are assigned with the channels that are just in a deep fading.

The future communication system will mostly focus on data traffic and be not strict with the time delay. Then, the packet switch is acceptable for the multiple access. When conducting the packet switch, the base station is required to assign channels to different users in real time, which is called the user scheduling. Two basic user-scheduling methods are being used currently in the wireless communication system. One is the Round Robin scheduling, in which channels are assigned to all users in a manner of the round robin. Similar to the circuit switch, the method can ensure the time delay characteristic and the fairness for users but cannot improve the performance of the system. The other is the Maximum C/I scheduling. It can assign channels to users having the maximum C/I according to current channel-fading conditions, thereby improving the system performance greatly. The gain that is obtained by the Maximum C/I scheduling is called the multiuser diversity.

Research also indicates that in the conventional multiuser single input single output system (MuSISO system), the system performance can reach the maximum by assigning channels to users having the maximum C/I. But the result cannot be applied to the multiuser multi-antenna system—the multiuser MIMO system. While applied to a multiuser system, multiple antennas can provide not only the multiuser access—the spatial division multiple accesses (SDMA), but also the diversity gain and multiplexing gain. By using the spatial division multiple access, a user permitted to be accessed is assigned with a certain spatial resource to create corresponding independent communication links, and the spatial resource of each user can be used to provide the diversity gain or the multiplexing gain. Research further shows that in case of multiple antennas, the system performance can reach the maximum only when channels are simultaneously assigned to one or more users. The above discovery, however, is only a guidance for a theory and lacks an efficient optimal user scheduling method.

For downlink of communication system, the spatial division multiple access can be performed by using methods of transmitting signal processings, such as the dirty paper coding (DPC) and the transmit beamforming (TBF), at base stations. But the method requires that transmitting terminals (base stations) know the precise fading coefficient of downward channels, which, however, is difficult to be realized in an actual system. Another method for performing the spatial division multiple accesses is by using the receiving signal processing. Concretely, the useful information is processed by using the method of the space coding or layered space-time signal processing at transmitting terminals and demodulated by interference elimination or signal detection at user terminals. Since the space-time coding and layered signal processing do not require the fading coefficient of the downward channels and are therefore suitable for performing the spatial division multiple access of the downward channels.

Further, when using the space-time coding based multiuser system, the performance of multiuser scheduling systems is poorer than that of the single antenna system. Therefore, in the multiuser scheduling system, it is apt to adopt the layered space-time signal processing based multiple input-multiple output system for each user permited to access, i.e., the transmitting terminals find out a users group according to the limited channel feedback information and assign antennas to all users of the user group in order to transmit an independent code stream of each user from each antenna assigned to the user. When the number of receving antennas $n_R$ is larger than that of transmitting antennas $n_T$ at the transmitting terminals, each user can establish an independent interference-free channel for each transmitting antenna. And in such case, the assignment of each transmitting terminal does not interfere the assignment of other antennas. U.S. Pat. No. 6,662,024 discloses a user scheduling arithmetic of the multiuser multiple input-multiple output sytem at the precondition of $n_R \geq n_T$. But when the number of receiving antennas is smaller than that the number of transmitting antennas, an independent interference-free channel cannot be established for each transmitting antenna according to the method disclosed in the patent and the method disclosed in U.S. Pat. No. 6,662,024 thus cannot be used.

Reference 1 (D. J. Mazzarese and W. A. Krzymien, [2003], "High throughput downlink cellular packet data access with multiple antennas and multiuser diversity") discloses a user scheduling method when $n_R=1$. It contends that the number of the scheduled users is always $n_T$, so that all $n_T$ transmitting antennas can be assigned to $n_T$ users, respectively. However, the problem is that the optimal performance of the system cannot be ensured.

Reference 2 (D. Aktas and H. E. Gamal, [2003], "Multiuser scheduling for MIMO wireless systems") deems that the number of the scheduled users should be a predetermined number L ($1 \leq L \leq n_T$) which requires to select L antennas from all $n_T$ transmitting antennas and assigns them to selected L users, respectively. The method is only efficient when the number L has been given since the value of L is not clear yet.

Methods disclosed in References 1 and 2 have following defects:

1) They are the methods of scheduling fixed number of users and the number of scheduled users is supposed to be known;
2) Their arithmetics cannot ensure the scheduling of all the supposed scheduled users, which leads to a loss of the performance of the system;
3) Solutions are all given when $n_R=1$, and no concrete arithmetic is given when $n_R>1$ due to the high complexity of the arithmetics.

Therefore, those disclosed methods cannot provide the optimal user scheduling according to channel conditions, i.e., they cannot provide the maximum system capacity.

SUMMARY OF THE INVENTION

A system and method for adaptive user scheduling for MIMO communication are disclosed. In one embodiment, an MIMO communication system capable of adaptive user scheduling comprises: a transmitting terminal, to transmit data frames containing at least channel estimation signal and user data, and at least one receving terminal, configured to receive the data frames transmitted by the transmitting terminal, and produce corresponding feedback information as well as recover the user data. The the feedback information comprises an optimal transmitting antenna set dedicated to the receiving terminal, the achievable channel capacity by each antenna within the antenna set, and the degradation factors caused by each of other unselected antennas to each of the selected antennas. The transmitting terminal produces scheduling information based on the feedback information. After that, the scheduling information will be used to adaptively schedule the users. The scheduling information comprises the scheduled users, number of data streams supported by each scheduled user, and the corresponding transmitting antenna for each of the data streams.

In one embodiment, an adaptive user scheduling method for a MIMO communication system of the present invention comprises: a) the receving terminal producing feedback information based on the channel fading condition between transmitted antennas and receiving antennas and feedbacks it to the transmitting terminal; b) the transmitting terminal receiving the feedback information and producing scheduling information and adaptively schedules the users according to the obtained scheduling information, wherein, the the feedback information comprises an optimal transmitting antenna set dedicated to the receiving terminal, the achievable channel capacity by each antenna within the antenna set, and the degradation factors caused by each of other unselected antennas to each of the selected antennas; and wherein, the scheduling information comprises the scheduled users, number of data streams supported by each scheduled user, and the corresponding transmitting antenna for each of the data streams.

BRIEF DESCRIPTION OF THE DRAWINGS

The present invention will become further apparent from the accompanying drawings.

DETAILED DESCRIPTION OF THE PRESENTLY PREFERRED EMBODIMENTS

One embodiment of the present invention comprises an adaptive MIMO communication system, which can provide the maximum channel capacity for the system by using an adaptive user scheduling.

Another embodiment of the present invention comprises an adaptive user scheduling method for the MIMO communication system, which can provide the optimal user scheduling according to the current channel conditions.

Compared with the prior art, the MIMO coommuncation system and the scheduling method of the present invention have the following advantages. First, since information fed back from each receiving terminal is: an optimal transmitting antenna set dedicated to the receiving terminal, the achievable channel capacity by each antenna within the antenna set, and the degradation factors caused by each of other unselected antennas to each of the selected antennas. The complexity of arithmetic for selecting transmitting antennas can be simplified without the awareness of the number of the scheduled users, and the absolute channel capacities is not affected by the number of the final scheduled users. Second, the number of the scheduled users at the transmitting terminal dependends on the current conditions of the channels without a predetermination. Therefore, the MIMO communication system can perform an adaptive user scheduling so that the intelligentization of the system control and the stability of the communication are achieved and the system capacity is always kept to its maximum.

The present invention will be described in conjunction with the aforesaid drawings.

Figure 1:
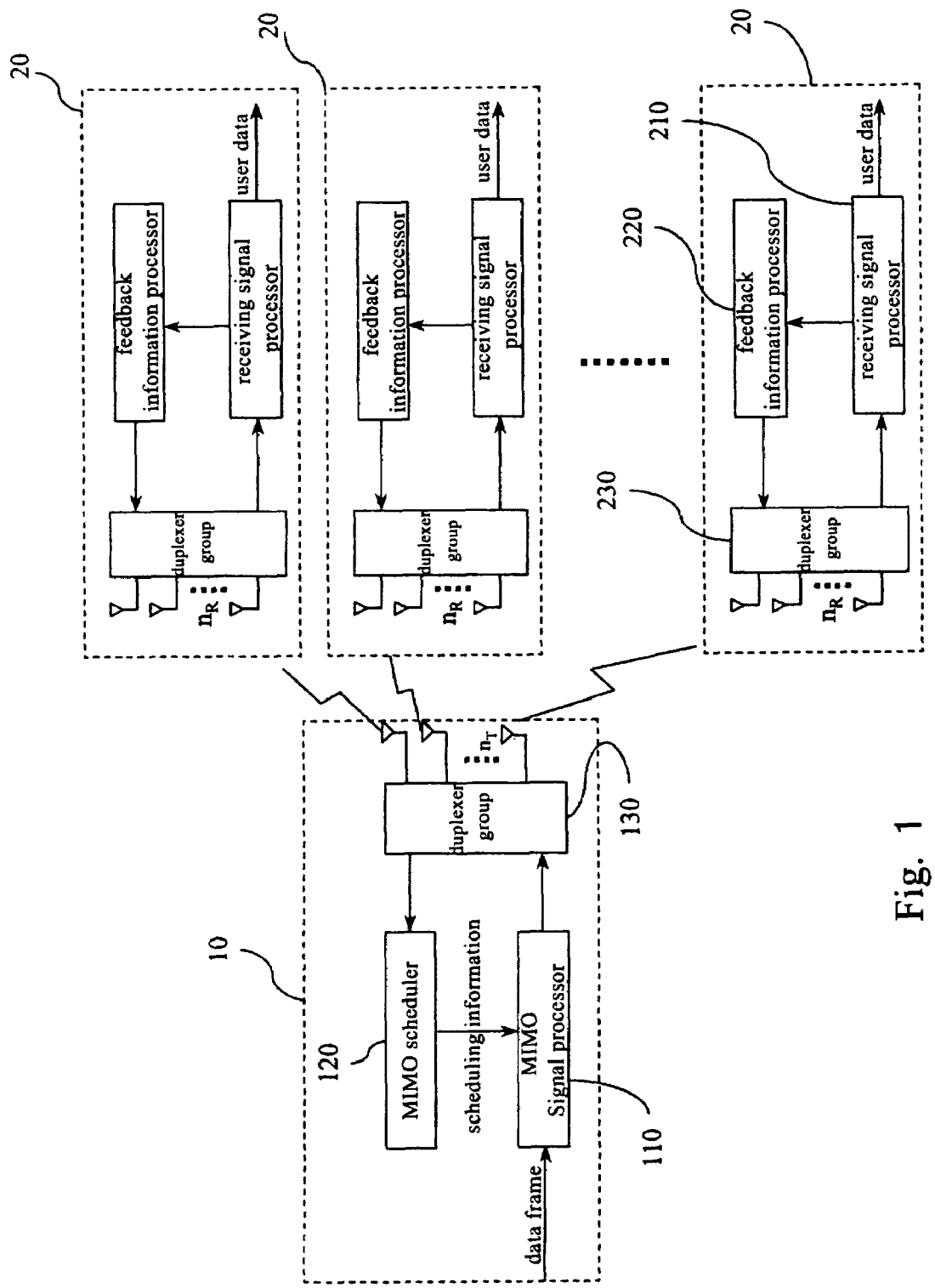
FIG. 1 is a block diagram showing a communication system of the present invention.
Figure 2:
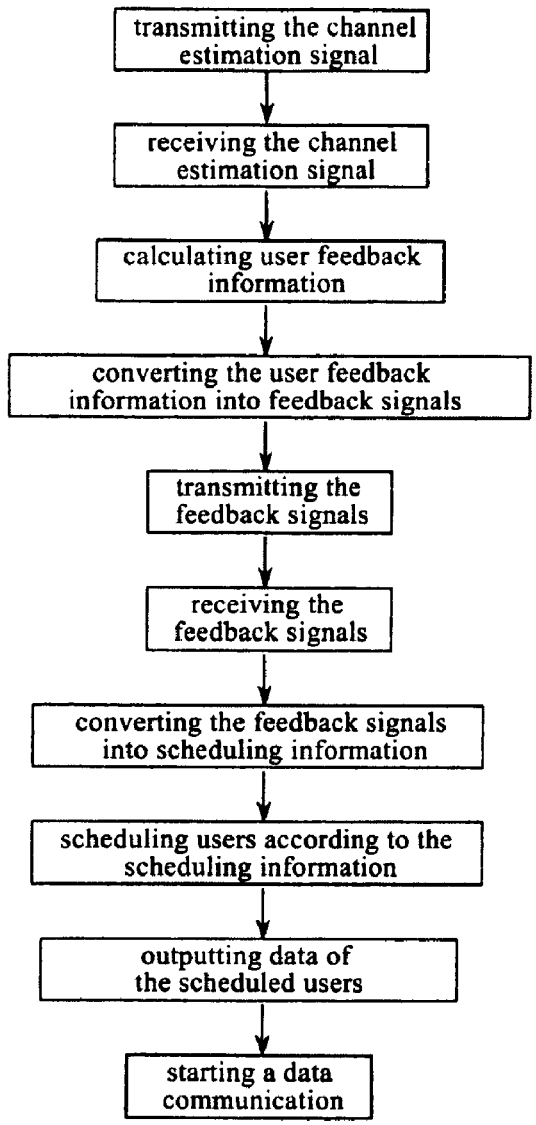
FIG. 2 is a flow chart showing an adaptive user scheduling in the communication system illustrated in FIG. 1.
Figure 3:
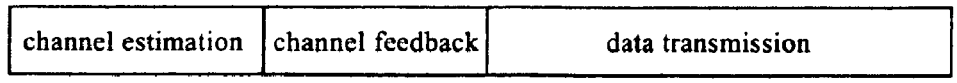
FIG. 3 illustrates a frame structure used in the MIMO communication system of the present invention.

FIG. 1 illustrates a MIMO communication system of the present invention, comprising: a transmitting terminal 10 (a base station) and a plurality of receiving terminals 20 (users). FIG. 2 is a flow chart showing an adaptive user scheduling for the communication system illustrated in FIG. 1. FIG. 3 illustrates a frame structure adopted for use in one embodiment of a MIMO communication system of the present invention.

As shown in FIGS. 1 to 3, the transmitting terminal 10 has a MIMO signal processor 110, a MIMO scheduler 120, a duplexer group 130 and $n_T$ transmitting antennas. Each receiving terminal 20 has a receiving signal processor 210, a feedback information processor 220, a duplexer group 230 and $n_R$ receiving antennas. The number of receiving antennas at each receiving terminal 20 can be different. The frame structure may be simply explained as including a time slot for channel estimation, a time slot for channel information feedback and a time slot for data transmssion. Other time slots can be set as desired by the system.

Process of Acquiring Scheduling Information

As shown in FIG. 3, the transmitting terminal 10 transmits the channel estimation signal to the receiving terminal 20 from $n_T$ transmitting antennas through the duplexer group 130 before it transmits a data signal.

It is supposed that the channel estimation signal transmitted by the transmitting terminal 10 is an $n_T$ dimensions complex numbers vector $X \in C^{n_T}$ and the signal received by each receiving terminal 20 is an $n_R$ dimensions complex numbers vector $y_k \in C^{n_R}$, and an $n_R \times n_T$ dimensions channel-fading matrix exists between the transmitting terminal 10 and the receiving terminal 20, as expressed in equation [1]:

$$H_k = [h_1^k, \ldots, h_{n_T}^k] = \begin{bmatrix} h_{1,1}^k & h_{1,2}^k & \cdots & h_{1,n_T}^k \\ h_{2,1}^k & h_{2,2}^k & & \\ \vdots & & \ddots & \vdots \\ h_{n_R,1}^k & & \cdots & h_{n_R,n_T}^k \end{bmatrix} \quad [1]$$

where, $h_{i,j}^k$ denotes the characteristic of the channel transmission between the $i^{th}$ transmitting antenna at the transmitting terminal 10 and the $j^{th}$ receiving antenna at the receiving terminal, and k denotes the $k^{th}$ user.

So the transfer function of the system can be expressed as equation [2]:

$$y_k = H_k x_k + \mu_k$$

$$k = 1, \ldots, K \quad [2]$$

where, $\mu_k \in C^{n_T}$ denotes an $n_R$ dimensions complex numbers vector indicating the white noise of the receiving terminal 20.

Each receiving terminal 20 knows the actual channel-fading matrix $H_k$ and processes it via the receiving signal processor 210 in order to obtain the following information:

1) a transmitting antenna set $AnI_k$ selected from all of the $n_T$ transmitting antennas for the receiving terminal 20 has the best performance. The number of the transmitting antennas in the selected transmitting antenna set $AnI_k$ equals to the number of the receiving antennas at the receiving terminal 20.

2) the channel capacity $R_{AnI_k}$ provided to the receiving terminal 20 by each antenna of the transmitting antenna set $AnI_k$ is calculated by the equation [3]:

$$R_j = \log\det\left(I_{n_{R_k}} + \frac{p}{n_{R_k}} h_j h_j^*\right) j \in AnI_k \quad [3]$$

where $$I_{n_{R_k}}$$

represents an $n_R$ level positive definite matrix and p represents a power.

The channel capacity $R_{AnI_k}$ provided to the receiving terminal 20 by each antenna of the transmitting antenna set $AnI_k$ is then obtained. The calculating method for obtaining $R_{AnI_k}$ is optional and is not limited to the one mentioned above.

3) the degradation factors Df caused by each of other unselected antennas of the $n_T$ transmitting antennas to each of the selected antennas of the selected antenna set $AnI_k$, is calculated by the receiving signal processor 210, as expressed in equation [4]:

$$Df_{k,i} = \log\det\left(I_{n_{R_k}} + \frac{p}{n_{R_k}}H_{AnI_k}H^*_{AnI_k}\left(I + \frac{p}{n_{R_k}}h_ih^*_i\right)^{-1}\right) i \in null(AnI_k) \quad [4]$$

The receiving signal processor 210 delivers the above processed information as the feedback information to the feedback information processor 220. The feedback information includes the optimal transmitting antenna set $AnI_k$ dedicated to the receiving terminal, the achievable channel capacity by each antenna within the antenna set $AnI_k$, and the degradation factors $Df_{k,i}$ caused by each of other unselected antennas of the $n_T$ transmitting antennas to each of the selected antennas of the selected antenna set $AnI_k$.

The feedback information processor 220 processes the received user information and converts it into feedback signals (RF signals) suitable for the MIMO communication system. The feedback signals are transmitted from the antennas at the receiving terminal 20 and fed back to the transmitting terminal 10 through feedback channels.

The transmitting terminal 10 receives the feedback signals and delivers them to the MIMO scheduler 120. The MIMO scheduler 120 produces scheduling information according to the feedback signals and controls operations of the MIMO signal processor 110 using the produced scheduling information to make the MIMO communication system in the scheduling state of the optimal system capacity. That is, the optimal user scheduling is performed using the scheduling information. The scheduling information includes at least the scheduled users, the number of data streams supported by each scheduled user, and the corresponding transmitting antenna for each of the data streams.

Further, after the scheduled users and the selected transmitting antennas are determined, the MIMO signal processor 110 processes data of the scheduled users and transmits the processed data from the selected transmitting antennas to the corresponding scheduled users.

Thus, an embodiment of the MIMO communication system has advantages as follows:

1) At each receiving terminal 20, the number of the transmitting antennas assigned thereto can be equal to the number of its receiving antennas as required;
2) Information fed back from each receiving terminal 20 is: an antenna set having the best performance, the absolute channel capacities provided by each of the selected antennas, and the degradation factors caused by each of the unselected antennas to each of the selected antennas. It can simplify the complexity of the arithmetic for selecting transmitting antennas without the awareness of the number of the scheduled users, and the absolute channel capacities will not be affected by the number of the final scheduled users;
3) At the transmitting terminal 10, the number of the scheduled users dependends on the current conditions of the channels without a predetermination.

Therefore, the MIMO communication system can perform an adaptive user scheduling, so that the intelligentization of system control and the stability of the communication are improved and the system capacity is always kept maximumly.

The above method for obtaining the channel fading conditions is performed by using the channel estimation signal (i.e., the pilot signal). Accroding to the method, the channel estimation signal is inserted into the data frame, and the receiving terminal 20 obtains the channel-fading conditions between the transmitting terminal 10 and the receiving terminal 20, and the receiving signal processor 210 processes the channel fading conditions to obtain the user feedback information.

In one embodiment of the present invention, the channel-fading conditions can also be obtained by using the Blind Channel Estimation, i.e., the time slot for channel estimation is not set in the data frame. The receiving terminal 20 obtains the channel-fading conditions via the Blind Channel Estimation after receiving data transmitted from the transmitting terminal 10, and the receiving signal processor 210 processes the channel-fading conditions to obtain the feedback information, thereby avoiding the waste of the frequency resource caused by the insertion of the pilot signal for purpose of channel estimation.

Figure 4:
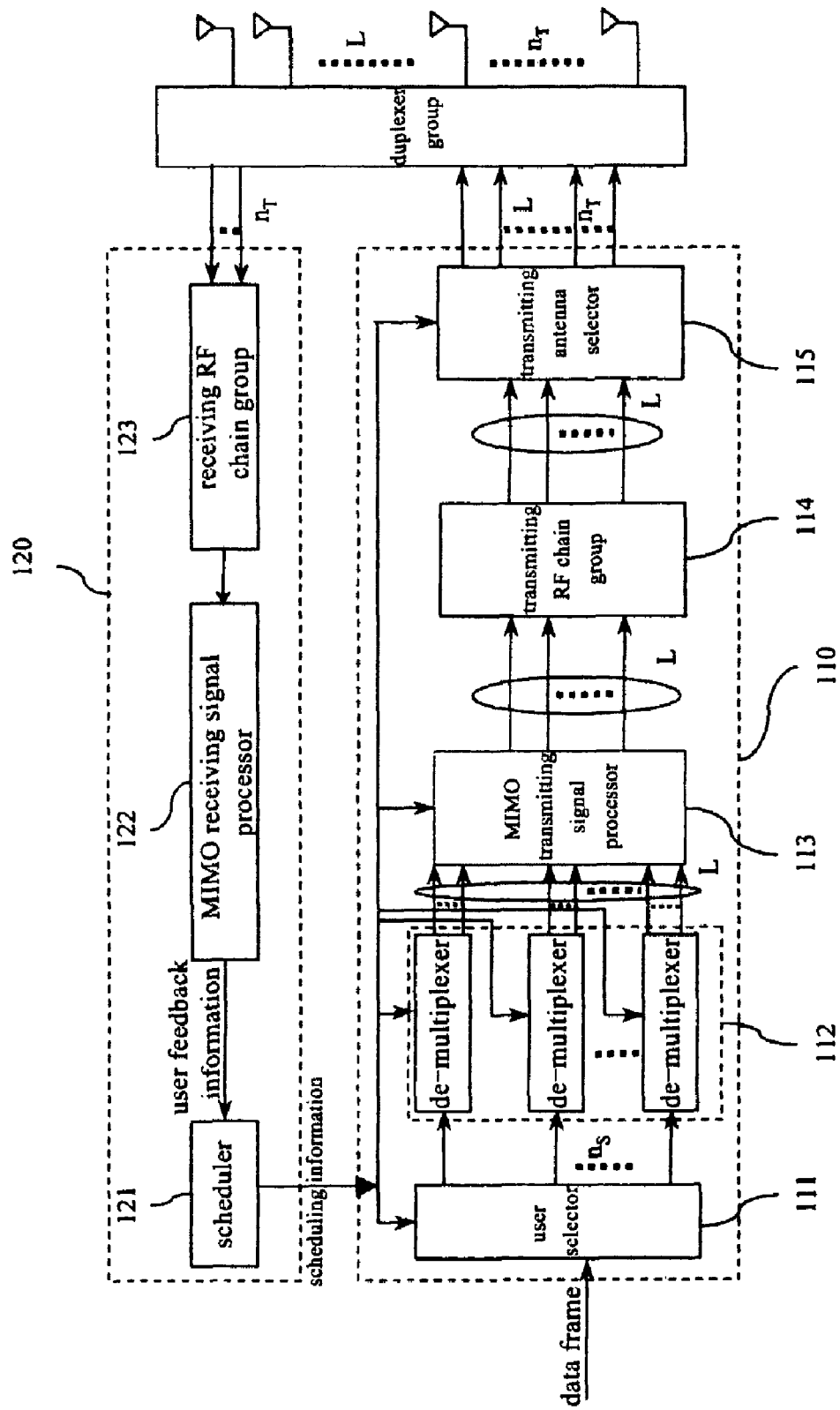
FIG. 4 illustrates a transmitting terminal in the MIMO communication system of the present invention.
Figure 5:
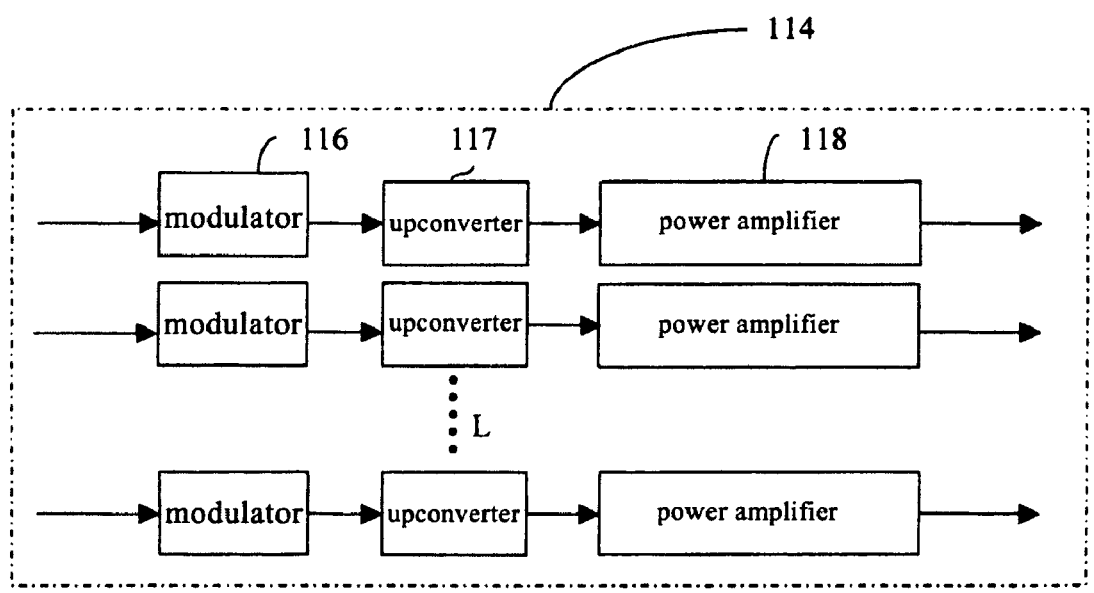
FIG. 5 illustrates a transmitting RF chain group at the transmitting terminal.
Figure 6:
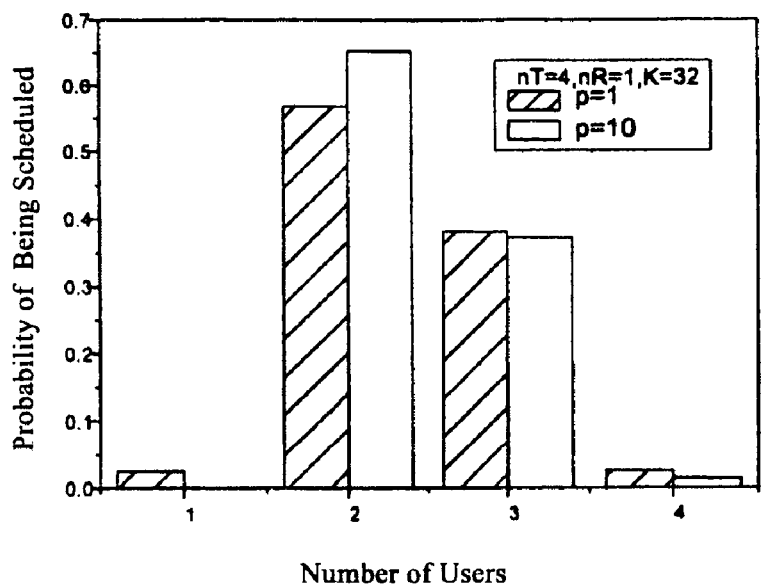
FIG. 6 illustrates the probability that users are scheduled in the MIMO communication system of the present invention.
Figure 7:
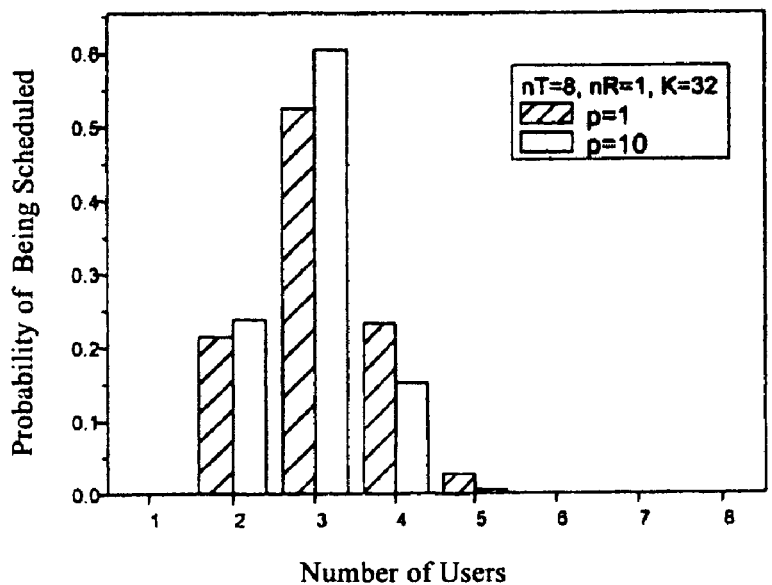
FIG. 7 illustrates the probability that users are scheduled in the MIMO communication system of the present invention.
Figure 8:
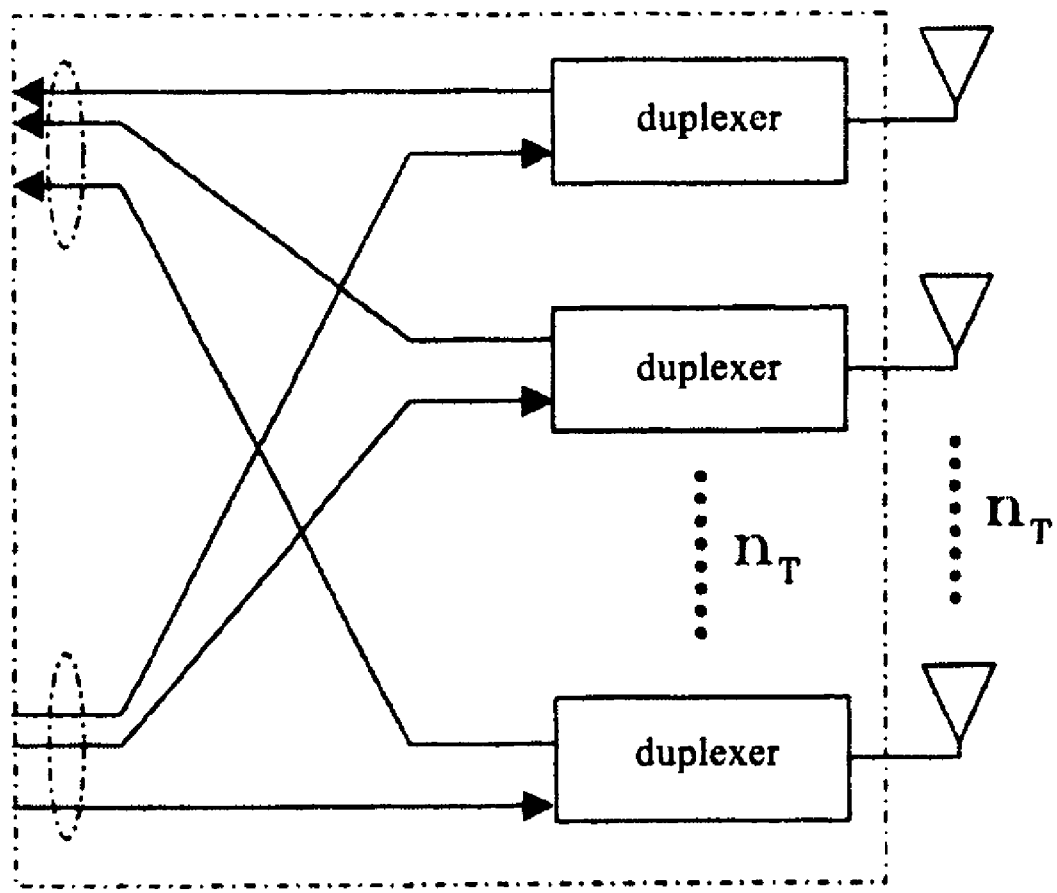
FIG. 8 illustrates a duplexer group at the transmitting terminal of the present invention.
Figure 9:
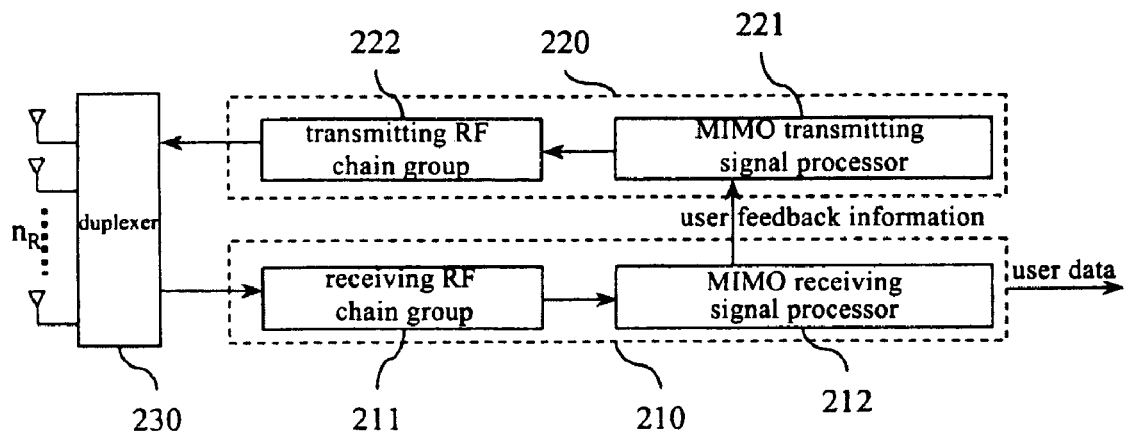
FIG. 9 illustrates a receiving terminal in the MIMO communication system of the present invention.

FIG. 4 illustrates a transmitting terminal 10 in the MIMO communication system of the present invention. FIG. 5 illustrates a transmitting RF chain group of the transmitting terminal 10. FIGS. 6 and 7 illustrate the probability that users are scheduled in the MIMO communication system of one embodiment of the present invention. FIG. 8 illustrates a duplexer group 130 for the transmitting terminal 10 of one embodiment of the present invention. FIG. 9 shows a receiving terminal 20 in one embodiment of the MIMO communication system of the present invention. FIGS. 4 and 9 illustrate that the communication of the MIMO system is conducted in a manner of the layered space-time signal processing. Other technologies in signal processing method and apparutus, such as the space-time coding, can also be adopted to process signals.

Process of the Transmission/Receiption of User Data and the Scheduling the Transmitting Terminal 10

In FIG. 4, the transmitting terminal 10 includes a MIMO signal processor 110, a MIMO scheduler 120, a duplexer group 130 and $n_T$ transmitting antennas.

The MIMO scheduler 120 includes a receiving RF chain group 123, a MIMO receiving signal processor 122 and a scheduler 121, wherein, the receiving RF chain group 123 has receiving RF chains corresponding to the number of the transmitting antennas, which convert the received feedback signals into the corresponding code streams. The MIMO receiving signal processor 122 performs the layered space-time signal processing for the converted code streams to obtain the corresponding scheduling information. The scheduling information includes: the users to be scheduled, the data streams supported by each scheduled user, and the tranmitting antennas for tranmitting data of the scheduled users. The scheduler 121 controls the signal processing of the MIMO signal processor 110 by using the scheduling information.

The MIMO signal processor 110 includes a user selector 111, a plurality of de-multiplexer 112 arranged in parallel, a MIMO transmitting signal processor 113, a transmitting RF chain group 114 and a transmitting antenna selector 115.

The user selector 111 selects the nS users to be scheduled under the control of the scheduling information and outputs the corresponding user data. Here, nS is less than or equal to the number of the transmitting antennas at the transmitting terminal 10.

Under the control of the scheduling information, nS de-multiplexers 112 are selected to perform the distributing processing on the user data of nS users to be scheduled, i.e., the user data of the nS users to be scheduled are divided into L code streams and outputted, wherein the maximum value of L equals to $n_T$, the number of transmitting antennas.

Then, L code streams outputted from the de-multiplexers 112 are processed by the MIMO transmitting signal processor 113 as L different layers with the manner of the layered space-time signal processing.

The transmitting RF chain group 114 converts L code streams processed by the layered space-time signal processing into the corresponding L RF signals.

Under the control of the scheduling information, the transmitting antenna selector 115 selects L scheduled transmitting antennas to transmit L RF signals outputted from the transmitting RF chain group 114 to L scheduled transmitting antennas through the duplexer group 130.

Finally, L scheduled transmitting antennas tranmit the RF signals to the scheduled users.

FIG. 5 further illustrates the concrete structure of the transmitting RF chain group 114, which includes L transmitting RF chains arranged in parallel. Each transmitting RF chain has a modulator 116, an upconverter 117, and a power amplifer 118 in series, and the power amplifier 118 can be a high power linear amplifier, where L transmitting RF chains convert L code streams from the MIMO transmitting signal processor 113 into the corresponding RF signals, respectively.

The value of L is set according to the design of the system, which will be described later.

FIG. 6 illustrates the probability that users are scheduled in one embodiment of the MIMO communication system of the present invention, wherein the transmitting terminal 10 has 4 transmitting antennas and the number of the receiving terminal 20 (a user) is K=32, each receiving terminal 20 has 1 receiving antenna. When the total power of the transmitting terminal 10 is P=1 and P=10, in the MIMO communication system, the maximum probability is to schedule 2 users, the next is 3, the least is 1 or 4, and other probabilities are nearly zero. Therefore, the value of L can be set as 3 or further as 4 to decrease the scheduling loss of the system.

Similarly, FIG. 7 also illustrates the probability that users are scheduled in the MIMO communication system of the present invention, where the transmitting terminal 10 has 8 transmitting antennas, the number of the receiving terminal 20 (a user) is K=32, each receiving terminal 20 has 1 receiving antenna. When the total power of the transmitting terminal 10 is P=1 and P=10, in the MIMO communication system, the maximum probability is to schedule 3 users, the next is 2 or 4, the least is 5, and other probabilities are nearly zero. Therefore, the value of L can be set as 4 or further as 5 to decrease the scheduling loss of the system.

It can be seen from the above description that the value of L can be modified according to the design of the system, and thus it is no need to set L as always $n_T$, the number of the transmitting antennas. That is, the value of L is determined at the time of designing the system according to the scheduling conditions of the system, so that the number of the transmitting RF chain group is not always set as $n_T$, which can cut down the cost of manufacturing the system.

FIG. 8 illustrates a duplexer group at the transmitting terminal of the present invention, where the duplexer group 130 has $n_T$ duplexers arranged in parallel and each duplexer connects with a corresponding transmitting antenna, the transmitting antenna selector 115 and the receiving RF chain group 123 as well.

The Receiving Terminal 20

To simplify the description, only the receiving terminal 20 for one scheduled user is shown here.

In FIG. 9, the receiving terminal 20 has a receiving signal processor 210, a feedback information processor 220, a duplexer group 230 and $n_R$ receiving antennas.

The receiving signal processor 210 includes a receiving RF chain group 211 and a MIMO receiving signal processor 212. The feedback information processor 220 includes a MIMO transmitting signal processor 221 and a transmitting RF chain group 222.

The receiving RF chain group 211 has receiving RF chains arranged in parallel (not shown), and the number of receiving RF chains equals to that of the receiving antennas, $n_R$. The receiving RF chains are used for resuming the received RF signals as the corresponding code streams and transmitting them to the MIMO receiving signal processor 212.

The MIMO receiving signal processor 212 recovers the code streams as the original user data and outputs them.

The scheduling process of one embodiment of the present invention will be more clearly described with reference to FIG. 10.

Figure 10:
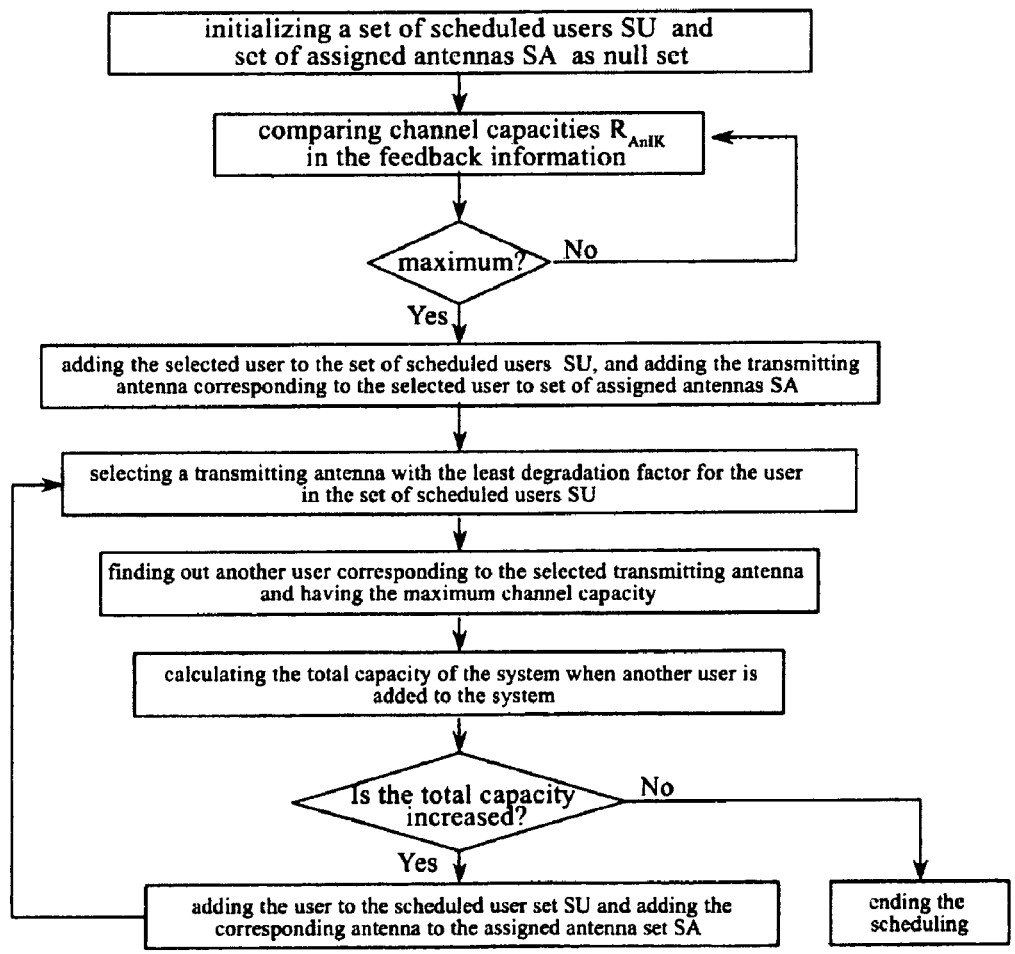
FIG. 10 is a flow chart showing that a scheduler adaptively selects users to be scheduled according to the feedback information.

FIG. 10 illustrates that the scheduler 121 adaptively selects the users to be scheduled according to the feedback information. The following steps explain the scheduling process:

1) initializing the set of scheduled users SU and set of assigned antennas SA as null set;
2) comparing channel capacities $R_{AnI_k}$ in the feedback information, and selecting a user having the maximum channel capacity, then adding the selected user to the set of scheduled users SU, and adding the transmitting antenna corresponding to the selected user to set of assigned antennas SA;
3) selecting a transmitting antenna with the least degradation factor for the user in the set of scheduled users, and finding out another user corresponding to the selected transmitting antenna and having the maximum channel capacity;
4) calculating the total capacity of the system when another user is added to the system, and if the total capacity is increased, adding the user to the scheduled user set SU and adding the corresponding antenna to the assigned antenna set SA and proceeding to step 3); if the total capacity is decreased, ending the scheduling process;
5) controlling the MIMO signal processor 110 according to the set of scheduled users SU and the set of assigned antennas SA, to divide data of the scheduled users into independent code streams and transmit them from the assigned transmitting antenna.

SCHEDULING EXAMPLES

For a description of the advantages of one embodiment of the present invention, the method disclosed in reference 2 is adopted here for a comparison. Since reference 2 only provides one concrete arithmetic when the number of antennas of each receiving terminal 20 is $n_R$=1 and the number of users to be scheduled is fixed (but it does not disclose the structure of the system). We suppose that the number of antennas of each receiving terminal 20 is $n_R$=1 and the number of the scheduled users is 2, which can be regard as the occasion that the number of the receiving antennas is less than that of the transmitting antennas. But such suppose is just for a better understanding of the present invention, and the method of the present invention can also be applied to the occasion that the number of the receiving antennas is larger than that of the transmitting antennas. In the meantime, for a concise explanation of the user scheduling, the calculation of the channel capacity and the disturbing factor is simplified but is consistent with the system.

Scheduling Example 1

Figure 11:
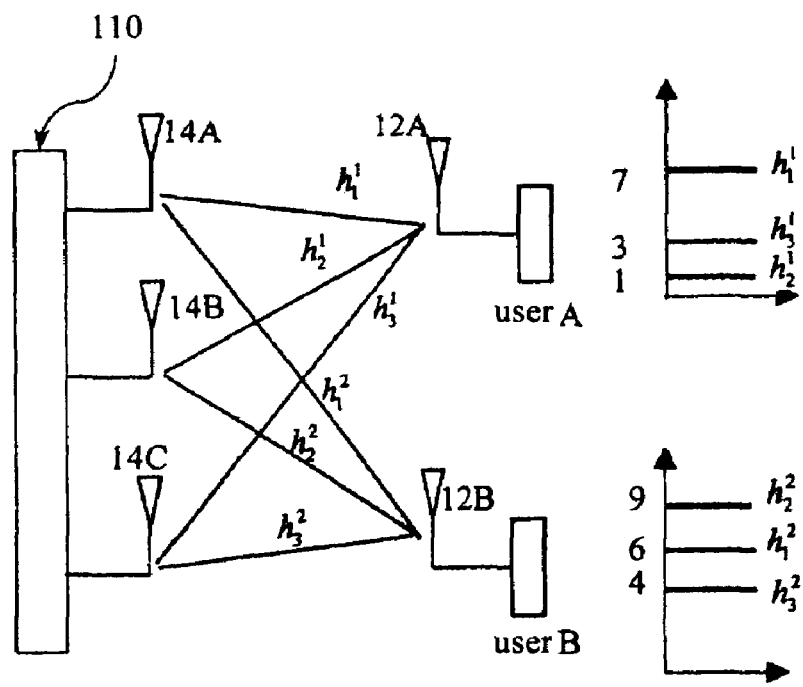
FIG. 11 illustrates the scheduling of the MIMO communication system of the present invention.

FIG. 11 illustrates the scheduling for the MIMO communication system of the present invention. The left part of FIG. 11 shows the simplified structure of the MIMO communication system, and the right part illustrates fading coefficients between the receiving antennas and the corresponding transmitting antennas.

As illustrated in FIG. 11, the scheduling system includes 1 transmitting terminal 10 and 2 users (the receiving terminals) A and B, wherein, the transmitting terminal 10 has three transmitting antennas 14A, 14B and 14C mounted on, and users A and B have receiving antennas 12A and 12B, respectively.

When the receiving antennas 12A and 12B of the users A and B receive the channel estimation signals sent from the transmitting antennas 14A, 14B and 14C, respectively, the MIMO receiving signal processors 212 calculate the fading coefficient between each receiving antenna and each transmitting antenna, wherein, the fading coefficients between the receiving antenna 12A of user A and the transmitting antennas 14A, 14B and 14C are $h_1^1=7$, $h_2^1=1$, and $h_3^1=3$, respectively; the fading coefficients between the receiving antenna 12B of user B and the transmitting antennas 14A, 14B and 14C are $h_1^2=6$, $h_2^2=9$, and $h_3^2=4$, respectively.

In Reference 2

According to the above fading coefficients, if the method of reference 2 is adopted, the feedback information of user A will be:
1) the transmitting antenna having the best performance for user A is the transmitting antenna 14A, i.e., the best transmitting antenna is $AnI_1=\{1\}$;
2) the transmitting antenna having the worst performance for user A, i.e., the transmitting antenna having the minimum disturbance or channel gain for user A, is the transmitting antenna 14B, marked with $S_1=\{2\}$; and
3) the signal-to-interference-plus-noise ratio of the best transmitting antenna to the worst transmitting antenna is:

$SINR_1=|h_1^1|/h_2^1=7$

Also, the feedback information of user B will be:
1) the transmitting antenna having the best performance for user B is the transmitting antenna 14B, i.e., the best transmitting antenna set is $AnI_2=\{2\}$;
2) the transmitting antenna having the worse performance for user B is the transmitting antenna 14C, which is marked with $S_2=\{3\}$; and
3) the signal-to-interference-plus-noise ratio of the best transmitting antenna to the worst transmitting antenna is:

$SINR_2=|h_2^2|/h_3^2=2.25$

Next, the transmitting terminal 10 schedules users according to the above feedback information:
1) to find out a user having the maximum signal-to-interference-plus-noise ratio. In such statement, the user is user A and the signal-to-interference-plus-noise ratio is 7;
2) to find out another user, and the best antenna for it must be the worst antenna for user A, i.e., the transmitting antenna 14B. User B is thus found. Then, a judgement is made on whether the worst antenna for user B is the best one for user A: if not, the introduction of the best antenna for user B will disturb user A, and user B cannot be scheduled; if yes, user B will be scheduled. Hence, the worst antenna for user B—the transmitting antenna 14B, is not the best antenna for user A—the transmitting antenna 14A but the transmitting antenna 14C, so user B cannot be scheduled. Meanwhile, since the feedback information includes $AnI_1$, $S_1$, $AnI_2$, $S_2$, $SINR_1$ and $SINR_2$, the conditions of channel gain of the system cannot be determined after user B is added to the system, according to these information. Therefore, user B cannot be scheduled; and
3) As a result, the system can only schedule one user, user A, and the transmitting antenna 14A is assigned to user A, and the channel gain is 7.

Embodiments of the Present Invention

From the results of the channel-fading coefficient, it can be known that the feedback information of user A is:
1) the transmitting antenna having the best performance for user A is the transmitting antenna 14A, i.e., the best transmitting antenna set is $AnI_1=\{1\}$;
2) the channel capacity that the antenna pair of 12A and 14A gives to user A, is $R_1=|h_1^1|=7$; and
3) the fading factors of each antenna pair formed between the receiving antenna 12A and the unselected transmitting antennas 14B and 14C are $Df_{1,2}=1$ and $Df_{1,3}=3$, respectively.

The feedback information of user B is:
1) the transmitting antenna having the best performance for user B is the transmitting antenna 14B, i.e., the best transmitting antenna set is $AnI_2=\{2\}$;
2) the channel capacity that the antenna pair 12B and 14B gives to user B, is $R_2=|h_2^2|=9$; and
3) the fading factors of each antenna pair formed between the receiving antenna 12B and the unselected transmitting antennas 14A and 14C are $Df_{2,1}=6$ and $Df_{2,3}=4$, respectively.

Next, the transmitting terminal 10 schedules users according to the above feedback information:
1) to find out a user having the maximum channel capacity. User B is found with the channel capacity 9, and the best transmitting antenna is determined as the transmitting antenna 14B;
2) to find out another user according to the found transmitting antenna 14B, the best antenna for another user must be the worst antenna for user B, i.e., the transmitting antenna 14C. Since the transmitting antenna 14C is not the best antenna for user A, user A cannot be scheduled; and
3) As a result, the system can schedule user B that can provide the maximum channel capacity, and the transmitting antenna 14B is assigned to user B, then the total channel gain is 9.

It can be seen from the comparison between the scheduling methods of reference 2 and the present invention that the scheduling method of one embodiment of the present invention can schedule user B having the maximum channel gain, e.g., 9, whereas the scheduling method of reference 2 can only obtain the channel capacity with 7. Therefore, the scheduling method of the present invention can provide the maximum channel capacity.

Scheduling Example 2

Figure 12:
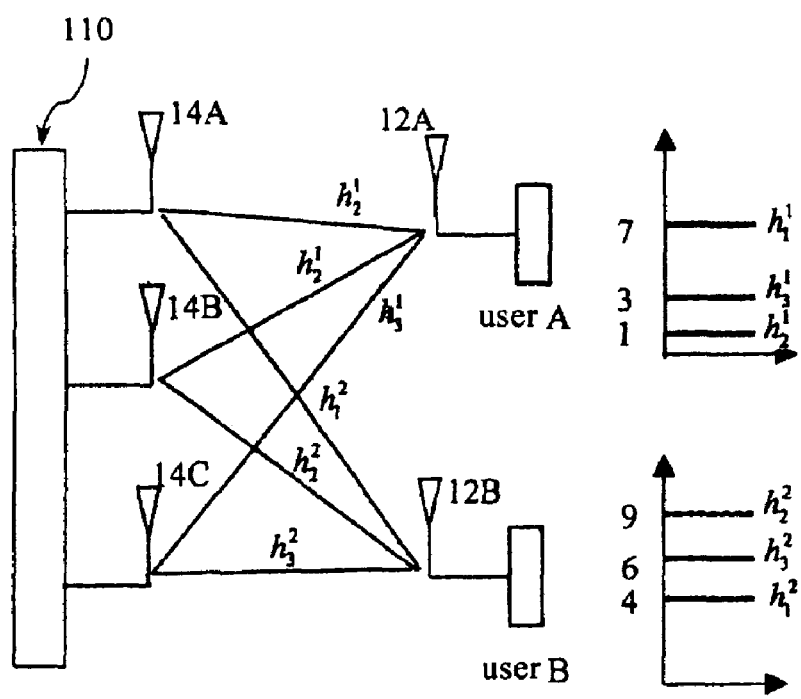
FIG. 12 illustrates the scheduling of the MIMO communication system of the present invention.

FIG. 12 illustrates the scheduling for the MIMO communication system of the present invention. The left part of FIG.

12 illustrates the simplified structure of the MIMO communication system, while the right part shows fading coefficients between the receiving antennas and the corresponding transmitting antennas. For the convienience of describing the present invention, same components are illustrated with same reference signs used in FIG. 11.

As illustrated in FIG. 12, the scheduling system includes one transmitting terminal 10 and two users A and B, wherein, the transmitting terminal 10 has three transmitting antennas 14A, 14B and 14C mounted on, and users A and B have receiving antennas 12A and 12B, respectively.

When the receiving antennas 12A and 12B of the users A and B receive the channel estimation signals sent from the transmitting antennas 14A, 14B and 14C, respectively, the MIMO receiving signal processors 212 calculate the fading coefficient between each receiving antenna and each transmitting antenna, wherein, the fading coefficients between the receiving antenna 12A of user A and the transmitting antennas 14A, 14B and 14C are $h_1^1=7$, $h_2^1=1$, and $h_3^1=3$, respectively; the fading coefficients between the receiving antenna 12B of user B and the transmitting antennas 14A, 14B and 14C are $h_1^2=4$, $h_2^2=9$, and $h_3^2=6$, respectively. It is substantially the same as shown in FIG. 8 but the gain of the transmitting antenna 14A of user B exchanges with that of the transmitting antenna 14C of user B.

In Reference 2

According to the above fading coefficients, if the method of reference 2 is adopted, the feedback information of user A will be:
1) the transmitting antenna having the best performance for user A is the transmitting antenna 14A, i.e., the best transmitting antenna set is $AnI_1=\{1\}$;
2) the transmitting antenna having the worst performance for user A is the transmitting antenna 14B, which is marked with $S_1=\{2\}$; and
3) the signal-to-interference-plus-noise ratio of the best transmitting antenna to the worst transmitting antenna is:

$$SINR_1=|h_1^1|/h_2^1|=7$$

Also, the feedback information of user B will be:
1) the transmitting antenna having the best performance for user B is the transmitting antenna 14B, which is marked with $AnI_2=\{2\}$;
2) the transmitting antenna having the worse performance for user B is the transmitting antenna 14A, which is marked with $S_2=\{1\}$; and
3) the signal-to-interference-plus-noise ratio of the best transmitting antenna to the worst transmitting antenna is:

$$SINR_2=|h_2^2|/h_1^2|=2.25$$

Next, the transmitting terminal 10 schedules users according to the above feedback information:
1) to find out a user having the maximum signal-to-interference-plus-noise ratio. In such statement, the user is user A and the signal-to-interference-plus-noise ratio is 7;
2) to find out another user, and the best antenna for it must be the worst antenna for user A, i.e., the transmitting antenna 14B. User B is found. Then, a judgement is made on whether the worst antenna for user B is the best one for user A; if not, the introduction of the best antenna for user B will disturb user A, and user B cannot be scheduled; if yes, it needs to further determine whether the introduction of user B can increase the channel capacity. The channel gain of the system provided by user B is 2.25, so user B becomes a user to be scheduled too; and
3) As a result, the system can schedule two users, user A and user B. The transmitting antennas 14A is assigned to user A and the transmitting antennas 14B is assigned to user B. The channel gains are 7 and 2.25 respectively and the total channel gain is 9.25.

In One Embodiment of the Present Invention

From the result of the channel-fading coefficients, it can be known that the feedback information of user A is:
1) the transmitting antenna having the best performance for user A is the transmitting antenna 14A, i.e., the best transmitting antenna set is $AnI_1=\{1\}$;
2) the channel capacity that the antenna pair of 12A and 14A gives to user A, is $R_1=|h_1^1|=7$; and
3) the fading factors of each antenna pair formed between the receiving antenna 12A and the unselected transmitting antennas 14B and 14C are $Df_{1,2}=1$ and $Df_{1,3}=3$, respectively The feedback information of user B is:
1) the transmitting antenna having the best performance for user B is the transmitting antenna 14B, i.e., the best transmitting antenna set is $AnI_2=\{2\}$;
2) the channel capacity that the antenna pair of 12B and 14B gives to user B, is $R_2=|h_2^2|=9$; and
3) the fading factors of each antenna pair formed between the receiving antenna 12B and the unselected antennas 14A and 14C are $Df_{2,1}=4$ and $Df_{2,3}=6$, respectively.

Next, the transmitting terminal 10 schedules users according to the above feedback information:
1) to find out a user having the maximum channel capacity. User B is found with channel capacity 9, and the best transmitting antenna is determined as the transmitting antenna 14B;
2) to find out another user according to the found transmitting antenna 14B, the best antenna for another user must be the worst antenna for user B, i.e., the transmitting antenna 14C. Since the transmitting antenna 14C is the best antenna for user A, and determination needs to be made on whether user A can increase the channel capacity of the system. It can be seen from the result of scheduling user A that the total channel gain is 9/4+7/1=9.25, larger than 9, so user A can be scheduled;
3) As a result, the system can schedule user A and user B. The transmitting antenna 14A is assigned to user A, the transmitting antenna 14B is assigned to user B, and the total channel gain is 9.25.

It can be seen from the comparison between the scheduling methods of reference 2 and the present invention that although the present invention and reference 2 can both schedule an optimal user group, the present invention realizes this function by an adaptive method, whereas reference 2 obtains the result under the condition that it must be known that two users are scheduled in advance. Under other conditions that scheduling two users may not be the best result, and the scheduling method of the present invention can find out the optimal group adaptively while the scheduling method of reference 2 cannot conduct such function.

Therefore, the scheduling method of the present invention is better than that of reference 2 and can provide the maximum channel capacity adaptively.

Figure 13:
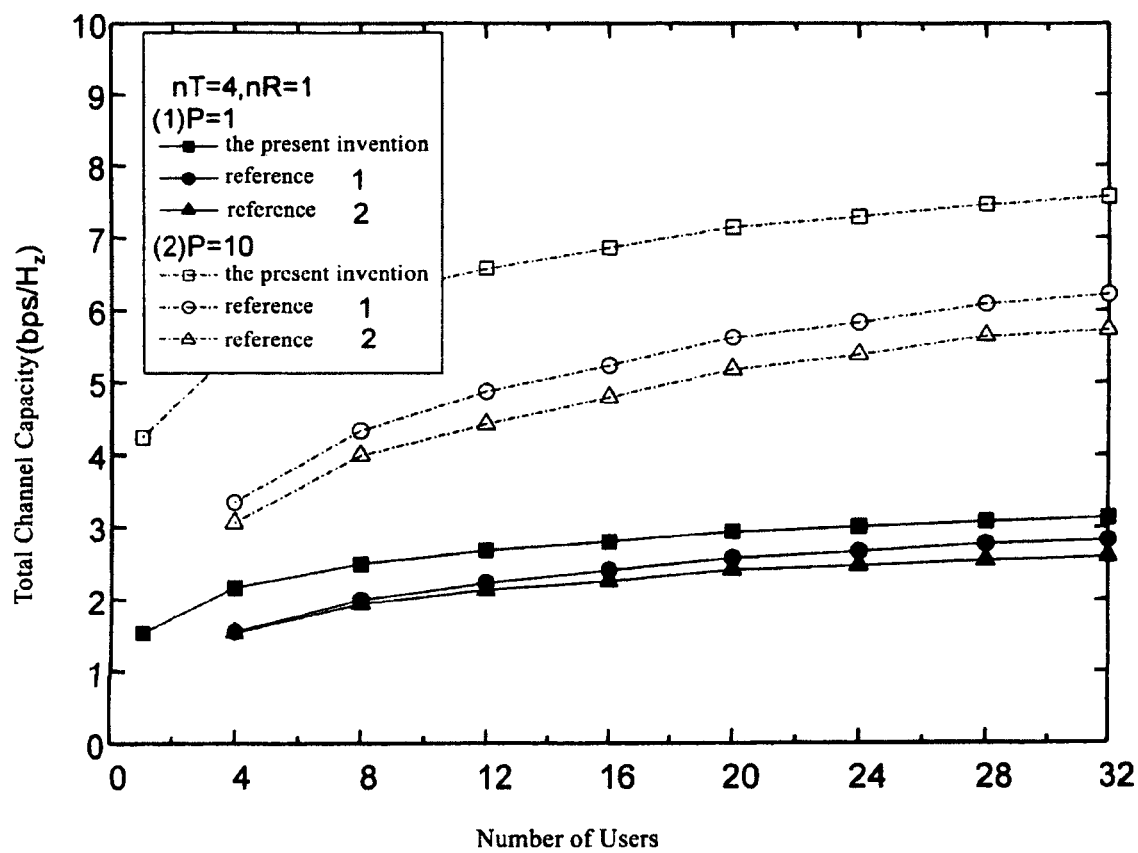
FIG. 13 illustrates the comparison of the performances of three different scheduling methods under the actual channel conditions.

To further represent the advantages of the adaptive scheduling system and the adaptive scheduling method of the present invention, a comparison of the performances between three dfferent scheduling methods in the real channel conditions is shown in FIG. 13, wherein, the x-axis denotes the number of users and the y-axis denotes the channel capacity, the number of transmitting antennas of the transmitting terminal 10 is 4, and each user has 1 receiving antenna and the total transmitting power of the transmitting terminal 10 is P=1 and P=10. The channel is supposed as the normalized Complex Gaussian distribution.

In FIG. 13, the channel capacity (the statistical mean value) increases as the users increase because the multiuser gain of the system increases with the increase of the number of users. Meanwhile, the channel capacity of the system increases as the total transmitting power of the transmitting terminal 10 P increases. It can be seen from the comparison of the three scheduling methods that the adaptive scheduling method of the present invention can obtain the maximum channel capacity of the system, even the numbers of transmitting antennas and receiving antennas as well as the transmitting power have been changed properly, the scheduling method of the present invention among three scheduling methods can also obtain the maximum channel capacity of the system.

Figure 14:
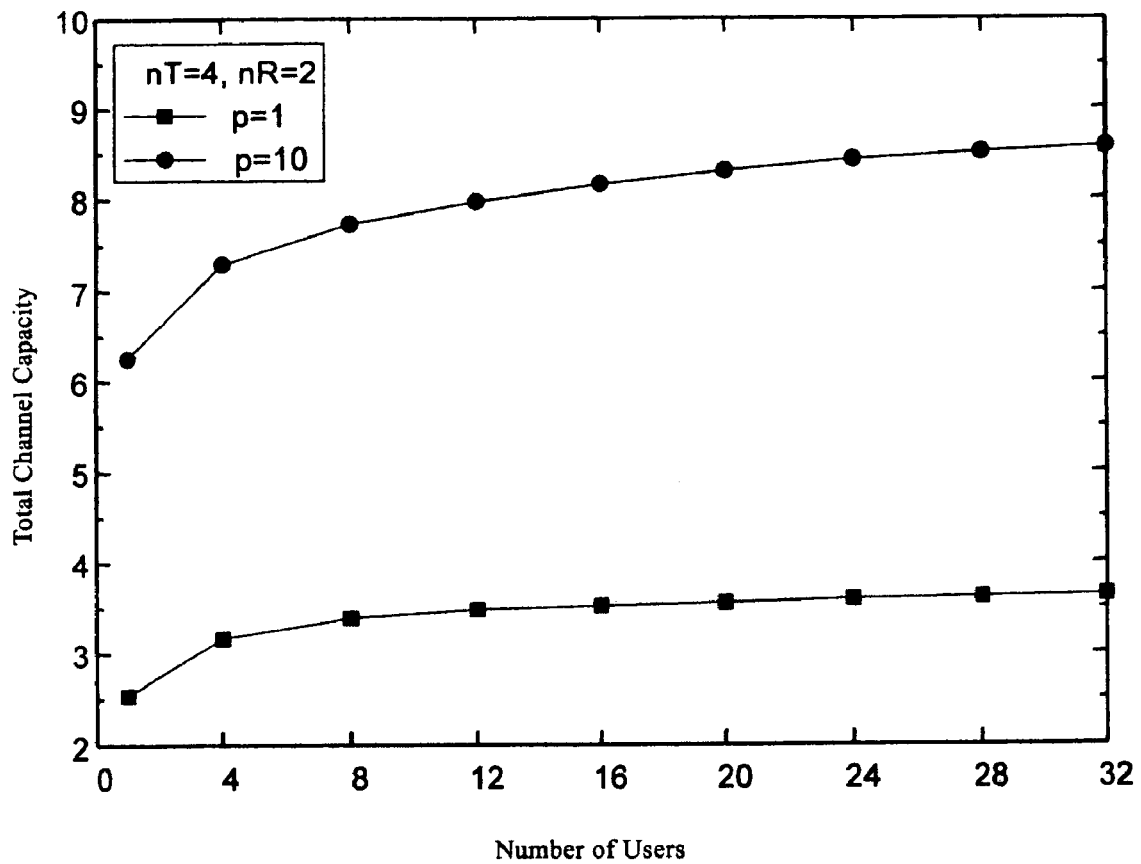
FIG. 14 illustrates the performance of one embodiment of a MIMO communication system of the present invention when each receiving terminal has a plurality of receiving antennas.

FIG. 14 illustrates the performance of the MIMO communication system of the present invention when each receiving terminal has a plurality of receiving antennas, wherein, the x-axis denotes the number of users and the y-axis denotes the channel capacity, the number of transmitting antennas of the transmitting terminal 10 is 4 and each user has 2 receiving antennas and the total transmitting power of the transmitting terminal 10 is P=1 and P=10. It can be seen that the channel capacity (the statistical mean value) increases as users increase, and the channel capacity of the system increases with the increase of the total transmitting power P of the transmitting terminal 10, which further displays the advantages of the adaptive scheduling of the present invention.

The above description focuses on the centralized multi-antenna system, a system that the transmitting antennas are mounted on the transmitting terminal 10 placed in the centre of a cellular. Further, the adaptive scheduling method of the present invention can also be applied to the distributed antenna system.

Figure 15:
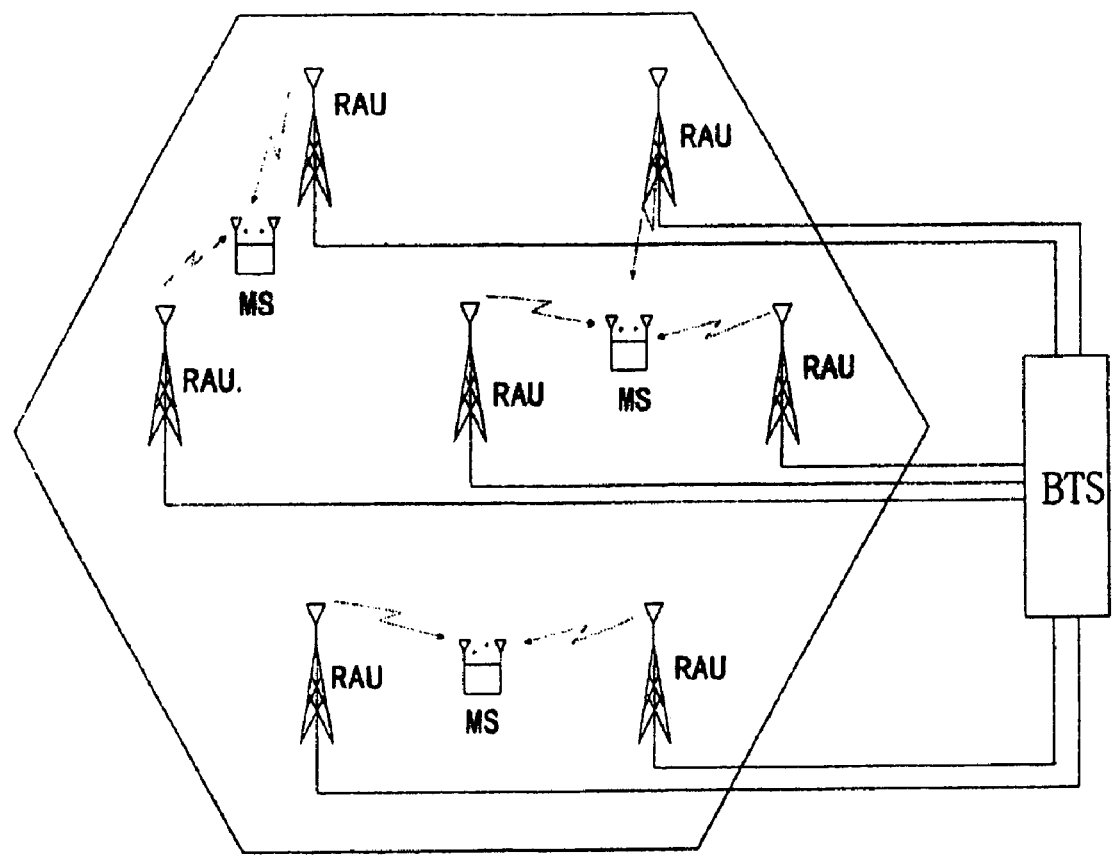
FIG. 15 illustrates an adaptive distributed MIMO communication system of the present invention.

FIG. 15 illustrates an adaptive distributed MIMO communication system of the present invention or an adaptive scheduling distributed multi-antenna system. Transmitting antennas are mounted on radio access units (RAU) similar to the base station, which are uniformly distributed in the whole cellular system. Certainly, locations that the RAUs are distributed in the whole cellular system can also be set in accordance with actual conditions in order to obtain the best performance of the system.

As shown in FIG. 15, the distributed multi-antenna system includes a plurality of radio access units (RAU), a base transceiver station (BTS), a plurality of users (MS) and connection links. Each radio access unit has at least one transmitting antenna mounted on for transceiving RF signals, and both the radio access units and the transmitting antennas are equivalent to the duplexer group 130 and transmitting antennas thereon, respectively. The radio access unit RAU includes at least one duplexer, and the number of the duplexers corresponds to the number of transmtting antennas connected thereto. The base transceiver station BTS is equivalent to the MIMO signal processor 110 and the MIMO scheduler 120 in FIG. 4. The connection links connect the plurality of radio access units RAU with the base transceiver station BTS to transfer signals therebetween. The connection links can be wire links, such as the high-speed optical fibers. In the meantime, the radio access unit is required with a conversion function of photo/electric or electric/photo. Users represent the receiving terminals 20 as shown in FIG. 6.

Thus, the operation of the distributed multi-anntenna system is similar to that of the centralized multi-antenna system mentioned above, and can decrease the system transmitting power and increase the data rate of the system relative to the centralized muti-antenna system.

In conclusion, the MIMO communication system and its communication method have following advantages:

1) Since information fed back from each receiving terminal 20 is: an antenna set having the best performance, the absolute channel capacities by each antenna within the antenna set and the degradation factors caused by each of other unselected antennas to each of the selected antennas, the complexity of the arithmetic for selecting transmitting antennas can be simplified without the awareness of the number of the scheduled users, meanwhile the absolute channel capacity will not be affected by the number of the final scheduled users;

2) the number of the scheduled users at the transmitting terminal 10 dependends on the current conditions of the channels without a predetermination.

Therefore, the MIMO communication system of the present invention can perform an adaptive user scheduling so that the intelligentization of the system control and the stability of the communication are improved and the system capacity is always kept at a maximum.

What is claimed is:

1. An adaptive user scheduling method for MIMO communication system, comprising:
   a) a plurality of receiving terminals producing feedback information based on a channel fading condition between transmitting antennas of a transmitting terminal and receiving antennas of the plurality of receiving terminals and feeding the feedback information to the transmitting terminal,
   b) the transmitting terminal receiving the feedback information from the plurality of receiving terminals and producing scheduling information and adaptively scheduling users associated with the plurality of receiving terminals according to the produced scheduling information,
   wherein the feedback information comprises an optimal transmitting antenna set of the transmitting terminal dedicated to each receiving terminal, the achievable channel capacity by each antenna within the antenna set, and the degradation factors caused by each of the transmitting antennas of the transmitting terminal not part of the optimal transmitting antenna set to each of the antennas that are part of the optimal transmitting antenna set,
   wherein the scheduling information comprises the scheduled users, a number of data streams supported by each scheduled user, and the corresponding transmitting antenna for each of the data streams, and
   wherein receiving the feedback information and producing scheduling information further comprises:
   initializing a set of scheduled users and a set of assigned antennas as null set;
   comparing the channel capacities in the feedback information, and selecting a user having the maximum channel capacity, then adding the selected user to the set of scheduled users and adding the transmitting antenna corresponding to the selected user to the set of assigned antennas;
   selecting a transmitting antenna with the least degradation factor to the transmitting antenna corresponding to the selected user in the set of scheduled users, and identifying another user corresponding to the selected transmitting antenna with the least degradation factor and having the maximum channel capacity among users that correspond to the selected transmitting antenna with the least degradation factor;

calculating the total capacity of the system when said another user is added to the system, if the total capacity is increased, adding said another user to the scheduled user set and adding the corresponding antenna with the least degradation factor to the assigned antenna set and proceeding to the step of selecting the transmitting antenna; if the total capacity is decreased, then ending the scheduling process; and scheduling users in the system according to the final scheduled users set and the assigned antennas set.

2. An adaptive user scheduling method for MIMO communication system, comprising:

a) a plurality of receiving terminals producing feedback information based on channel fading condition between transmitting antennas of a transmitting terminal and receiving antennas of the plurality of receiving terminals and feeding the feedback information to the transmitting terminal, b) the transmitting terminal receiving the feedback information from the plurality of receiving terminals and producing scheduling information and adaptively scheduling the users associated with the plurality of receiving terminals according to the produced scheduling information, wherein the feedback information comprises an optimal transmitting antenna set of the transmitting terminal dedicated to each receiving terminal, the achievable channel capacity by each antenna within the antenna set, and the degradation factors caused by each of the transmitting antennas of the transmitting terminal not part of the optimal transmitting antenna set to each of the antennas that are part of the optimal transmitting set, wherein the scheduling information comprises the scheduled users, a number of data streams supported by each scheduled user, and the corresponding transmitting antenna for each of the data streams, wherein the channel fading conditions are obtained via channel estimation signal received by the receiving terminal, and wherein receiving the feedback information and producing scheduling information further comprises:

initializing a set of scheduled users and a set of assigned antennas as null set;

comparing the channel capacities in the feedback information, and selecting a user having the maximum channel capacity, then adding the selected user to the set of scheduled users, and adding the transmitting antenna corresponding to the selected user to the set of assigned antennas;

selecting a transmitting antenna with the least degradation factor to the transmitting antenna corresponding to the selected user in the set of scheduled users, and identifying another user corresponding to the selected transmitting antenna with the least degradation factor and having the maximum channel capacity among users that correspond to the selected transmitting antenna with the least degradation factor;

calculating the total capacity of the system when said another user is added to the system, if the total capacity is increased, adding said another user to the scheduled user set and adding the corresponding antenna with the least degradation factor to the assigned antenna set and proceeding to the step of selecting the transmitting antenna; if the total capacity is decreased, then ending the scheduling process; and scheduling users in the system according to the final scheduled users set and the assigned antennas set.

3. An adaptive user scheduling method for MIMO communication system, comprising:

a) a plurality of receiving terminals producing feedback information based on channel fading condition between transmitting antennas of a transmitting terminal and receiving antennas of the plurality of receiving terminals and feeding the feedback information to the transmitting terminal, b) the transmitting terminal receiving the feedback information from the plurality of receiving terminals and producing scheduling information and adaptively scheduling users associated with the plurality of receiving terminals according to the produced scheduling information, wherein the feedback information comprises an optimal transmitting antenna set of the transmitting terminal dedicated to each receiving terminal, the achievable channel capacity by each antenna within the antenna set, and the degradation factors caused by each of the transmitting antennas of the transmitting terminal not part of the optimal transmitting antenna set to each of the antennas that are part of the optimal transmitting antenna set, wherein the scheduling information comprises the scheduled users, a number of data streams supported by each scheduled user, and the corresponding transmitting antenna for each of the data streams, wherein the channel fading conditions are obtained via data frames received by the receiving antennas, and wherein receiving the feedback information and producing scheduling information further comprises:

initializing a set of scheduled users and a set of assigned antennas as null set;

comparing the channel capacities in the feedback information, and selecting a user having the maximum channel capacity, then adding the selected user to the set of scheduled users, and adding the transmitting antenna corresponding to the selected user to the set of assigned antennas;

selecting a transmitting antenna with the least degradation factor to the transmitting antenna corresponding to the selected user in the set of scheduled users, and identifying another user corresponding to the selected transmitting antenna with the least degradation factor and having the maximum channel capacity among users that correspond to the selected transmitting antenna with the least degradation factor;

calculating the total capacity of the system when said another user is added to the system, and if the total capacity is increased, adding said another user to the scheduled user set and adding the corresponding antenna with the least degradation factor to the assigned antenna set and proceeding to the step of selecting the transmitting antenna; if the total capacity is decreased, then ending the scheduling process; and scheduling users in the system according to the final scheduled users set and the assigned antennas set.

* * * * *